US006326040B1

(12) United States Patent
Kearney et al.

(10) Patent No.: US 6,326,040 B1
(45) Date of Patent: Dec. 4, 2001

(54) BEVERAGE PRODUCTS HAVING SUPERIOR VITAMIN STABILITY

(75) Inventors: Donald Raymond Kearney; Sanford Theodore Kirksey, Jr., both of Cincinnati; Donald Joseph Cox, Hamilton, all of OH (US)

(73) Assignee: The Procter & Gamble Co., Cincinnati, OH (US)

( * ) Notice: Subject to any disclaimer, the term of this patent is extended or adjusted under 35 U.S.C. 154(b) by 0 days.

(21) Appl. No.: 09/510,958

(22) Filed: Feb. 22, 2000

Related U.S. Application Data

(60) Provisional application No. 60/123,271, filed on Mar. 8, 1999.

(51) Int. Cl.[7] ............................. A23L 1/302; A23L 1/303; A23L 2/00
(52) U.S. Cl. ............................. 426/271; 426/72; 426/73; 426/330.3; 426/335; 426/590; 426/599
(58) Field of Search ................... 426/271, 330.3, 426/590, 599, 335, 72, 73

(56) References Cited

U.S. PATENT DOCUMENTS

| | | | |
|---|---|---|---|
| 2,846,317 | 8/1958 | Bersworth et al. | 99/182 |
| 2,847,308 | 8/1958 | Bersworth et al. | 99/48 |
| 3,202,515 | 8/1965 | Stone | 99/48 |
| 3,483,033 | 12/1969 | Casey | 127/61 |
| 4,066,794 | 1/1978 | Schur | 426/61 |
| 5,336,510 | 8/1994 | Chang | 426/72 |
| 5,431,940 | 7/1995 | Calderas et al. | 426/330.3 |
| 5,773,062 | 6/1998 | Cirigliano et al. | 426/330.3 |
| 6,036,986 | * 3/2000 | Cirigliano et al. | 426/330.3 |

FOREIGN PATENT DOCUMENTS

| | | | |
|---|---|---|---|
| 0 386 963 | 9/1990 | (EP) | A23L/2/38 |
| 98/48648 | 11/1998 | (WO) | A23L/2/385 |

OTHER PUBLICATIONS

*The North American New Product Report,* Jan. 23, 1998, pp. 13–14.
*The uses of EDTA and other chelates in industry,* Manufacturing Chemist & Aerosol News, Mar.,1978, pp. 79, 80, 83.

* cited by examiner

Primary Examiner—Helen Pratt
(74) Attorney, Agent, or Firm—Kelly L. McDow-Dunham; Carl J. Roof

(57) ABSTRACT

Disclosed are beverage products with improved vitamin stability. The beverage products include an effective amount of a aminopolycarboxylic acid as well as an effective amount of a polyphosphate, and can be enriched with one or more vitamins or other nutrients. In one embodiment, the beverage products include added water, fruit juice, ascorbic acid, ethylene diamine tetra-acetic acid (EDTA), sodium hexametaphosphate, and potassium sorbate. The beverage can be packaged in relatively inexpensive HDPE-type containers which are generally oxygen permeable, and do not require the use of special oxygen barrier packaging to preserve the vitamins and flavor oils from oxidation.

17 Claims, No Drawings

BEVERAGE PRODUCTS HAVING SUPERIOR VITAMIN STABILITY

CROSS REFERENCE TO RELATED APPLICATIONS

This application claims the benefit of U.S. Provisional Application No. 60/123,271 filed Mar. 8, 1999.

FIELD OF THE INVENTION

The present invention relates to beverage products, such as carbonated and noncarbonated beverage products containing fruit juice and having superior vitamin and flavor stability.

BACKGROUND OF THE INVENTION

Controlling vitamin and flavor stability of dilute juice beverages is an ongoing concern among beverage manufacturers. It is important that beverages maintain their intended flavor characteristics and nutritional characteristics, even after prolonged periods of shelf storage.

One source of flavor degradation is microbial growth. Another source of flavor degradation is oxidation of certain unsaturated compounds. Additionally, oxidation can also be a cause of degradation of vitamin compounds. For instance, certain water soluble vitamins, oil soluble vitamins, flavor oils, and flavor essences can be degraded by oxidation if dissolved oxygen is present in the beverage container.

Microbial degradation can result from accidental inoculation of the beverage products during manufacturing or packaging. Food spoilage microorganisms can then rapidly proliferate by feeding on nutrients provided by the fruit juice component of the noncarbonated dilute juice beverages. Flavor degradation and vitamin degradation due to oxidation can occur when dissolved oxygen and a catalyst, such as metal ions, are present in the packaged beverage, or when the beverage package is relatively oxygen permeable, such as in the case of relatively inexpensive plastic packaging, such as high density polyethylene (HDPE) packages. Such plastic containers can provide a relatively poor barrier to oxygen, when compared to containers made of glass or metal. Oxygen passing through the container can cause oxidation of beverage ingredients which include water and oil soluble components, including vitamins and flavor components including flavor oils. This oxidation can result in the loss of vitamin content and the formation of undesirable flavors and/or odors.

Microbial stability in dilute beverage products can be provided to some extent by heat pasteurizing during packaging (hot packing) or by packaging under completely aseptic conditions (aseptic packaging). Special packaging constructions for providing a barrier between oxygen in the atmosphere and the beverage can also be used to reduce the amount of oxygen that enters the beverage over time. However, such processing or packaging methods are generally undesirable from a cost and complexity standpoint. Also, flexible containers made from polymeric materials, such as high density polyethylene, which have become more popular with consumers, should not be subjected to the pasteurization temperatures utilized during hot packing operations.

U.S. Pat. No. 5,431,940 to Calderas et al. discloses a beverage containing a polyphosphate and a preservative for beverage products that are to be stored at ambient temperatures for at least about 10 days without substantial microbial proliferation. One disadvantage associated with the polyphosphate disclosed in U.S. Pat. No. 5,431,940 is that, over time, the effectiveness of the polyphosphate as a chelating agent may be reduced. Without being limited by theory, it is believed that the chain length of the polyphosphate can be reduced over time, such as by hydrolysis.

SUMMARY OF THE INVENTION

Accordingly, Applicants have found that it would be desirable to provide a beverage product which has the antimicrobial effectiveness of a polyphosphate and preservative combination, yet maintains chelation activity in the beverage for a substantially longer period of time than is provided by polyphosphates.

Applicants have discovered that dilute juice beverages fortified with vitamins can lose at least some vitamin content to oxidation, despite the use of a polyphosphate and preservative combination. Without being limited by theory, it is believed that trace metal ions in the beverage can be a food source for microbes, and can also serve as a catalyst for oxidation of compounds such as vitamins and flavor oils.

According to one embodiment of the present invention, a beverage composition is provided having a first chelating agent, which can comprise an aminopolycarboxylic acid, such as ethylene diamine tetra-acetic acid (EDTA), and a second chelating agent, which can comprise a polyphosphate. The first chelating agent provides chelating properties over an extended length of time as compared to the second chelating agent, and is present in quantities effective to reduce the rate of oxidation of vitamins and flavor oils. The second chelating agent provides chelating properties over a relatively shorter period of time as compared to the first chelating agent. The second chelating agent can have a rate of degradation by hydrolysis which is greater than that of the first chelating agent.

The second chelating agent, in combination with a preservative, is present in quantities effective to kill microbes which may be present during the initial packaging of the beverage. The presence of second chelating agent is effective in reducing microbial activity during the early portion of the beverage's shelf life, while the first chelating agent provides sustained chelating activity to preserve vitamins and flavor compounds in the beverage over longer periods of time.

According to one embodiment of the present invention, a noncarbonated, vitamin enriched beverage composition comprises added water, ascorbic acid, flavor oils, between about 20 and about 30 ppm of EDTA, a preservative such as potassium sorbate, and about 300 to about 3000 ppm of a polyphosphate having the formula:

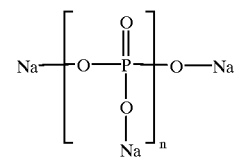

where n averages from about 17 to about 60.

DETAILED DESCRIPTION OF THE INVENTION

As used herein, "microbial proliferation" means a 100 fold increase or greater in the number of beverage spoilage microorganisms in a noncarbonated beverage product after an initial contamination level of about 10 cfu/ml. Beverage products described as "microbially stable" exhibit less than a 100 fold increase in the level of microorganisms when stored at 73° F. for at least 28 days, following an initial contamination level of 10 cfu/ml of spoilage microorganisms. Beverages described as "microbially unstable" exhibit more than a 100 fold increase in the level of microorganisms when stored at 73° F. for 28 days, following an initial contamination level of 10 cfu/ml of spoilage microorganisms.

As used herein, the term "noncarbonated beverage products" refers to beverage products having less than 1 volume of carbonation.

As used herein, the term "comprising" means various components can be conjointly employed in the preparation of the noncarbonated beverage products of the present invention.

As used herein "lipid soluble" refers to the portion of plant or animal tissue which dissolves when the plant or animal tissue is extracted with a nonpolar solvent (e.g. ether, chloroform, benzene, or an alkane). Lipid soluble components include carboxylic acids (or fatty acids), glyceryl trialkanoates (or neutral fats), phospholipids, glycolipids, waxes, terpenes, steroids, and prostaglandins.

All weights, parts and percentages used herein are based on weight unless otherwise specified.

U.S. Pat. No. 5,431,940 to Calderas et al. and U.S. patent application Ser. No. 08/892,674 now abandoned filed Jul. 14, 1997 in the names of Smith et al. are incorporated herein by reference.

The beverage compositions of the present invention comprise a first chelating agent and a second chelating agent. The first chelating agent can comprise an aminopolycarboxylic acid, such as ethylene diamine tetra-acetic acid (EDTA). The second chelating agent can comprise a food grade polyphosphate, such as sodium hexametaphoshpate. The first chelating agent provides chelating properties over an extended length of time as compared to the second chelating agent, and is present in quantities effective to prevent the oxidation of vitamins and flavor oils. The second chelating agent provides chelating properties over a relatively shorter period of time as compared to the first chelating agent. The second chelating agent can have a rate of degradation by hydrolysis which is greater than that of the first chelating agent.

The second chelating agent, in combination with a preservative, is present in quantities effective to kill microbes which may be present during the initial packaging of the beverage. The presence of second chelating agent is effective in reducing microbial activity during the early portion of the beverage's shelf life, while the first chelating agent provides sustained chelating activity to preserve vitamins and flavor compounds in the beverage over longer periods of time.

According to one embodiment of the present invention, a noncarbonated, vitamin enriched beverage composition comprises added water; one or more water or oil soluble vitamins; flavor components such as flavor oils; calcium disodium EDTA; sodium hexametaphosphate, and a preservative such as potassium sorbate.

In one particular embodiment, a noncarbonated, vitamin enriched juice beverage according to the present invention comprises at least about 80% added water; between about 1% and about 20% fruit juice; sufficient ascorbic acid to provide at least 50%, more particularly at least about 100%, still more particularly at least about 150% of the of the USRDI (U.S. Recommended Daily Intake) of vitamin C per eight fluid ounce serving; between about 2 ppm and about 30 ppm calcium disodium EDTA; between about 100 ppm and about 400 ppm potassium sorbate; and about 100 to about 3000 ppm of a polyphosphate such as sodium hexametaphosphate. By way of example, for the beverage compositions described herein, 50% of the USRDI for Vitamin C, per eight fluid ounce serving, is equivalent to about 30 milligrams per eight fluid ounce serving.

Depending upon the initial amount of ascorbic acid in the beverage as packaged, and the oxygen permeability of the beverage package, the combination of the EDTA and the polyphosphate can provide a beverage composition which maintains a desired level of vitamin C for shelf storage periods in excess of four months.

First Chelating Agent

The first chelating agent can comprise an aminopolycarboxylic acid. The beverages of the present invention can comprise at least about 1 ppm, more particularly at least 2 ppm, still more particularly at least about 5 ppm, still more particularly at least about 10 ppm, and still more particularly between about 20 ppm and about 30 ppm of an aminopolycarboxylic acid. In one embodiment, the beverages of the present invention comprise between about 20 ppm and about 30 ppm of calcium disodium EDTA. Suitable USP edetate calcium disodium/food grade EDTA is available in powder form under the name VERSENE from the Dow Chemical Company.

The Fruit Juice Component

The beverage products of the present invention can contain fruit juice, which can provide flavor and nutrition. Beverage products of the present invention can comprise at least about 0.1% by weight, and more particularly from 0.1% to about 40% by weight fruit juice. In one embodiment, the beverage composition includes from about 0.1% to about 20%, more particularly from about 1% to about 20%, still more particularly from about 1% to about 10%, and still more particularly from about 1% to about 6% by weight of one or more fruit juices (weight percentage based on single strength 2–16° Brix fruit juice. The fruit juice can be incorporated into the beverage product as a puree, comminute or as a single strength or concentrated juice.

Suitable juices include any citrus juice, non-citrus juice, or mixture thereof, which are known for use in beverage products Examples of such fruit juices include, but are not limited to, non-citrus juices such as apple juice, grape juice, pear juice, nectarine juice, currant juice, raspberry juice, gooseberry juice, blackberry juice, blueberry juice, strawberry juice, custard-apple juice, pomegranate juice, guava juice, kiwi juice, mango juice, papaya juice, watermelon juice, cantaloupe juice, cherry juice, cranberry juice, peach juice, apricot juice, plum juice and mixtures thereof, and citrus juices such as orange juice, lemon juice, lime juice, grapefruit juice, tangerine juice and mixtures thereof. Other fruit juices (e.g. pineapple), and nonfruit juices such as vegetable or botanical juices, can be used with the fruit juice component of the noncarbonated beverage products of the present invention.

Water Soluble Vitamins

The beverage products of the present invention can be fortified with one or more water soluble vitamins, including but not limited to vitamins C and B 1. The beverage product can be fortified with an amount of ascorbic acid sufficient to provide at least about 50%, more particularly at least about 100%, still more particularly at least about 150% of the USRDI requirement for Vitamin C per eight fluid ounce serving. The beverage products can also be fortified with at least about 10% of the USRDI requirement for Vitamin B1 per eight fluid ounce serving.

Lipid Soluble Component

The beverage products of the present invention can include a lipid soluble component comprising unsaturated organic compounds. Such unsaturated organic compounds include, but are not limited to, mono-, di-, and triglycerides incorporating fatty acids with one or more double bonds; and unsaturated terpenes such as limonene, alpha-pinene, citral, citronellal, and p-cymene. Such unsaturated organic compounds can be components of beverage ingredients, including but not limited to unsaturated oils such as vegetable oils (e.g. cottonseed oil), weighting oils, flavor oils, essence oils, and flavor components of fruit pulp.

The beverages of the present invention can also be fortified with at least 10%, more particularly at least 25%, and still more particularly at least about 50% of the USRDI of one or more oil soluble vitamins per eight fluid ounces, including but not limited to Vitamin A, such as in the form of beta carotene. By way of example, the beverages of the present invention can include at least about 10% of the USRDI of Vitamin A per eight fluid ounces, corresponding to about 500 IU of vitamin A per eight fluid ounces.

The Added Water Component

The beverages herein can also comprise an added water component. For purposes of defining the beverage products herein, the added water component does not include water incidentally added to the beverage product via other added materials such as, for example, the fruit juice component. The beverage products of the present invention typically comprise at least about 50% by weight of added water, more typically from about 80% to about 99% by weight of water, and still more typically from about 80% to about 95% by weight of water.

The term "hardness" as used herein refers to the presence of calcium and magnesium cations in water, generally. For purposes of the present invention, hardness of the added water component is calculated according to Association of Official Analytical Chemists (AOAC) standards set forth in Official Methods of Analysis, published by the AOAC, Arlington, Va., pp. 627–628 (14th ed. 1984), which is incorporated herein by reference. Under AOAC standards, hardness is the sum of $CaCO_3$ equivalents (mg/L) in water, which sum is obtained by multiplying the concentrations (mg/L) found of the following cations in the water by the factors.

TABLE 1

| Cation | Factor |
|--------|--------|
| Ca | 2.497 |
| Mg | 4.116 |
| Sr | 1.142 |
| Fe | 1.792 |
| Al | 5.564 |
| Zn | 1.531 |
| Mn | 1.822 |

Compounds that impart hardness to water are primarily magnesium and calcium carbonates, bicarbonates, sulfates, chlorides and nitrates, although other compounds which can contribute polyvalent cations to water can also impart hardness. Water based on hardness is normally classified as soft (0–60 ppm), moderately hard (61–120 ppm), hard (121–180 ppm) and very hard (over 180 ppm). Preferably, the hardness of the added water component ranges from 0 to about 220 ppm. In one embodiment, the water hardness can range from 0 to about 180 ppm, more particularly from about 0 to about 60 ppm, and still more particularly from about 0 to about 30 ppm.

The added water can have an alkalinity of less than about 300 ppm. The term "alkalinity" as used herein refers to the presence of carbonate and bicarbonate anions in water, generally. For purposes of the present invention, alkalinity of the added water component is measured according to AOAC standards set forth in Official Methods of Analysis, published by the AOAC, Arlington, Va., pp 618–619 (14th ed. 1984), which is incorporated herein by reference. The standard AOAC Titrimetric Method for measuring hardness can involve automatic titrators and pH meters, suitably calibrated, or visual titration. Alkalinity is then calculated and expressed as $CaCO_3$ (mg/L) equivalents in the added water component. Compounds that impart alkalinity to water include carbonate, bicarbonate, phosphate, hydroxide and silicate salts of potassium, sodium, calcium and magnesium.

For purposes of defining the beverage products herein, the added water component does not include water incidentally added to the beverage product via other added materials such as, for example, the fruit juice component.

The Preservative System including Second Chelating Agent

The beverage products of the present invention preferably comprise a preservative system containing a preservative and the second chelating agent comprising a food grade polyphosphate.

A. The Preservative

The beverage products herein comprise from about 100 ppm to about 1000 ppm, more particularly from about 200 ppm to about 500 ppm, and still more particularly from about 200 to about 400 ppm, of a preservative selected from the group consisting of sorbic acid, benzoic acid, alkali metal salts thereof, and mixtures thereof. The preservative can be selected from the group consisting of sorbic acid, potassium sorbate, sodium sorbate and mixtures thereof. The use of sorbates, benzoates and mixtures thereof as preservatives in beverage products is well known, as is the mechanism by which such preservatives inhibit microbial growth in food products generally. Sorbates and benzoates are described, for example, by Davidson and Branen, *Antimicrobials in Foods*, Marcel Dekker, Inc., pp. 11–94 (2nd ed. 1993), which description is incorporated herein by reference.

The use of straight chain polyphosphates, alone or in combination with preservatives, to inhibit microbial growth in food products is also well known. Polyphosphates are described, for example, in *Handbook of Food Additives*, CRC Press, pp. 643–780 (2nd ed. 1972), which description is incorporated herein by reference. Moreover, the synergistic or additive antimicrobial effect from phosphates combined with a preservative (e.g., sorbates, benzoates, organic acids) in food products is disclosed in U.S. Pat. No. 3,404,987 to Kooistra et al.

B. The Food Grade Polyphosphate

The beverage products can comprise from about 100 ppm to about 3000 ppm, more particularly from about 500 ppm to about 2500 ppm, still more particularly from about 900 to about 2000 ppm, and still more particularly from about 1200 ppm to about 1800 ppm, of a polyphosphate characterized by the following structure:

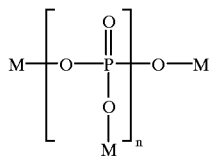

where n averages from about 3 to about 100 and each M is independently selected from the group of sodium and potassium atoms.

In one embodiment, the beverage composition comprises from about 1200 to about 1800 of a sodium polyphosphate having the formula

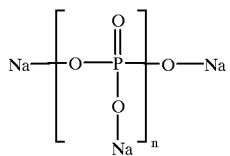

where n averages from about 17 to about 60.

More particularly, n can range from about 20 to about 30, and in one embodiment n averages about 21.

Without being limited by theory, it is believed that straight chain polymeric phosphates can exhibit better antimicrobial activity in the noncarbonated beverage products of the present invention than other food grade phosphates. Well-known food grade phosphates include, for example, orthophosphate, cyclic polyphosphates, monobasic calcium phosphate, dipotassium phosphate, disodium phosphate, sodium phosphate, sodium pyrophosphate, sodium metaphosphate and tetrasodium pyrophosphate.

The polyphosphates for use in the noncarbonated beverage products herein and the selected preservatives also for use in the beverage product herein act synergistically, or at least additivity, to inhibit microbiological growth in the beverage products of the present invention. This combination in the beverage products herein is particularly effective in inhibiting yeast, including preservative resistant Zygosaccharomyces bailii, and acid tolerant preservative resistant bacteria.

It is believed that the particular straight chain polymeric sodium phosphates described herein (e.g., those having an average chain length ranging from about 17 to about 60), can provide superior microbial stability to beverages containing them compared to straight chain polymeric phosphates having an average chain length of other than from about 17 to about 60, especially when the water hardness of the added water component of the beverages (hereinafter described) ranges from 61 ppm to about 220 ppm. In particular, the noncarbonated beverages herein, which contain straight chain polymeric sodium phosphates having an average chain length ranging from about 17 to about 30, can exhibit less than a 100 fold increase in the level of microorganisms when stored at 73° F. for at least 28 days, after an initial contamination level of 10 cfu/ml of spoilage microorganisms. Preferably, the beverages herein will exhibit less than a 100 fold increase in the level of microorganisms when stored at 73° F. for at least 60 days, more preferably at least 100 days, after an initial contamination level of 10 cfu/ml of spoilage microorganisms. In general, the lower the water hardness of the added water, the longer the beverage will remain microbially stable.

It is believed that the improved microbial stability of the noncarbonated beverages herein which contain straight chain polymeric sodium phosphates having an average chain length of from about 17 to about 60 can be attributed to the particular characteristics of the straight chain polymeric sodium phosphates employed. It is believed that, upon hydrolysis, straight chain polymeric sodium phosphates having an average chain length of from about 17 to about 60 break down to straight chain polymeric sodium phosphates that are still effective in providing microbial stability to the beverages containing them for a period of time, after which the EDTA can be effective in providing chelating action in the beverage. By contrast, straight chain polymeric phosphates having an average chain length of less than about 21 will hydrolyze into straight chain polymeric phosphates which are not effective in providing microbial stability to the beverages containing them. Straight chain polymeric phosphates having an average chain length of greater than about 60 are not necessarily soluble in the beverage products described herein.

Another advantage of the straight chain polymeric sodium phosphates of the present invention is that they can provide microbial stability to the beverages herein even when the added water component of the beverages comprises moderately hard to hard water. Thus, there is frequently no need to soften the water before it is incorporated into the beverage.

Sweetener

The noncarbonated beverage products of the present invention can, and typically will, contain an artificial or natural, caloric or noncaloric, sweetener. Preferred are carbohydrate sweeteners, more preferably mono- and or di-saccharide sugars.

Specifically, the noncarbonated beverage products will typically comprise from about 0.1% to about 20%, more preferably from about 6% to about 14%, sugar solids by weight of the beverage products. Suitable sweetener sugars include maltose, sucrose, glucose, fructose, invert sugars and mixtures thereof. These sugars can be incorporated into the beverage products in solid or liquid form but are typically, and preferably, incorporated as a syrup, more preferably as a concentrated syrup such as high fructose corn syrup. For purposes of preparing the beverage products of the present invention, these optional sweeteners can be provided to some extent by other components of the beverage products such as the fruit juice component, optional flavorants, and so forth.

Preferred carbohydrate sweeteners for use in the beverage products are sucrose, fructose and mixtures thereof. Fructose can be obtained or provided as liquid fructose, high fructose corn syrup, dry fructose or fructose syrup, but is preferably provided as high fructose corn syrup. High fructose corn syrup (HFCS) is commercially available as HFCS-42, HFCS-55 and HFCS-90, which comprise 42%, 55% and 90%, respectively, by weight of the sugar solids therein as fructose.

Optional artificial or noncaloric sweeteners for use in the noncarbonated beverage product include, for example, saccharin, cyclamates, sucralose, acetosulfam, acesulfame-K, L-aspartyl-L-phenylalanine lower alkyl ester sweeteners (e.g., aspartame), L-aspartyl-D-alanine amides disclosed in U.S. Pat. No. 4,411,925 to Brennan et al., L-aspartyl-D-serine amides disclosed in U.S. Pat. No. 4,399,163 to Brennan et al., L-aspartyl-L-1-hydroxymethyl-alkaneamide sweeteners disclosed in U.S. Pat. No. 4,338,346 to Brand, L-aspartyl-1-hydroxyethylakaneamide sweeteners disclosed in U.S. Pat. No. 4,423,029 to Rizzi, L-aspartyl-D-phenylglycine ester and amide sweeteners disclosed in European Patent Application 168,112 to J. M. Janusz, published Jan. 15, 1986, and the like. A particularly preferred sweetener is aspartame.

Other Ingredients

The noncarbonated beverage products herein can further comprise any other ingredient or ingredients typically used as optional beverage ingredients. Such optional ingredients include preservatives (e.g., organic acids), colorants and so forth.

The noncarbonated beverage products can further comprise gums, emulsifiers and oils to affect texture and opacity. Typical ingredients include guar gum, xanthan, alginates, mono- and di-glycerides, lecithin, carboxymethylcellulose (CMC), pectin, pulp, cottonseed oil, sunflower oil, vegetable oil, food starches and weighting oils/agents. Esters and other flavor and essence oils can also be incorporated into the beverage products.

Acidity

The noncarbonated beverage products of the present invention have a pH of from about 2.5 to about 4.5, particularly from about 2.5 to about 3.5, more particularly from about 2.7 to about 3.3, and still more particularly from about 2.9 to about 3.1. Beverage acidity can be adjusted to and maintained within the requisite range by known and conventional methods, e.g., the use of food grade acid buffers.

Preparation

The noncarbonated beverage products of the present invention can be prepared by conventional methods for formulating noncarbonated dilute juice beverages. Such conventional methods can involve hot packing or aseptic packaging operations, although such operations are not necessary for achieving the extended ambient display times described hereinbefore.

Methods for making dilute juice beverages, for example, are described in U.S. Pat. No. 4,737,375 to Nakel et al., which is incorporated herein by reference. Methods for making beverage products are also described by Woodroof and Phillips, *Beverages: Carbonated & Noncarbonated*, AVI Publishing Co.(rev. ed. 1981); and by Thorner and Herzberg, *Non-alcoholic Food Service Beverage Handbook*, AVI Publishing Co. (2nd ed. 1978).

One method for preparing the beverage products herein involves making a beverage base, adding to it to a sugar syrup containing polyphosphate, and then trimming the mixture with water, sugar syrup, and beverage concentrate to obtain the requisite acidity and material composition.

In such a method, the beverage base can be prepared by admixing to water an acidulant (e.g., citric acid), water soluble vitamins, lipid soluble vitamins, flavorants including juice concentrate, EDTA, and preservative. An oil in water emulsion, which provides opacity and texture to the beverage products, can be added to the base. The sugar syrup for use in preparing the beverage products is separately prepared by adding sugar syrup (e.g., high fructose corn syrup) to water, and then adding ascorbic acid, polyphosphate and thickening agents to the syrup. Additional preservative can be added to the resulting sugar syrup. The sugar syrup and base are combined to form a noncarbonated beverage product. The noncarbonated beverage product can be trimmed with small amounts of added water, sugar syrup and beverage base to achieve the requisite acidity and composition of the noncarbonated beverage product of the present invention. It can then be pasteurized, packaged and stored.

Other well known and conventional variations of the above described beverage formulation technique can, therefore, be used to prepare the noncarbonated beverage products herein.

Another method of preparing the beverage compositions comprises forming a beverage base, followed by forming a beverage syrup, followed by forming a finished beverage product (single strength) by adding water to the syrup.

Test Methods

Test Method: Microbial Stability

The term "microbial proliferation" as used herein means a 100 fold increase or greater in the number of beverage spoilage microorganisms in a noncarbonated beverage product after an initial inoculation level of about 10 cfu/ml. Beverage products described as "microbially stable" exhibit less than a 100 fold increase in the level of microorganisms when stored at 73° F. for at least 28 days, following an initial contamination level of 10 cfu/ml of spoilage microorganisms. Beverages described as "microbially unstable" exhibit more than a 100 fold increase in the level of microorganisms when stored at 73° F. for 28 days, following an initial contamination level of 10 cfu/ml of spoilage microorganisms.

The microbial stability a noncarbonated beverage product can be determined by the following method. Beverage products are inoculated with mixed groups of preservative resistant yeast containing at least four separate yeast isolates, including *Zygosaccharomyces bailii*, and with mixed groups of preservative resistant, acid tolerant bacteria, including Acetobacter species. All yeast and bacteria utilized in the inoculation are previously isolated from preserved fruit juice beverages. Inoculated beverage products are maintained at 20° C. for at least 60 days and aerobic plate cultures performed periodically. Aerobic plate counts of both yeast and bacteria populations are performed as described in the *Compendium of Methods for the Microbiological Examinations of Foods*, American Public Health Association, Washington, D.C. (edited by C. Vanderzant and D. F. Splittstoesser), which description is incorporated herein by reference. These plate counts are then used to identify the degree of microbial proliferation in the inoculated beverage product.

| Test Method: Average Chain Length of Sodium Polyphosphate | |
|---|---|
| Reagents and Equipment: | |
| Deuterium Oxide (D$_2$O) | |
| NMR tubes | 5 mm OD, Wilmad Glass, 507PP |
| | 10 mm OD, Wilmad Glass, 513-5PP |
| NMR tube pressure caps | 5 mm OD, Wilmad Glass, 521 |
| | 10 mm OD, Wilmad Glass, 521-C |
| Disposable transfer pipets | Curtin Matheson, 355-123 |
| Probe for AC-300 | 5 or 10 mm |
| Pyrex wool | Corning Glass |
| Disposable wipers | Kimberly-Clark, Kim-Wipes |
| Spinner Turbine | 5 mm, Bruker |
| | 10 mm, Bruker |
| Spectrometer | Bruker AC-300, equipped with 5 mm or 10 mm probe |

Procedure

1. Dissolve about 100 mg of sample in deuterium oxide (D$_2$O) to prepare a solution having a concentration of about 12% by weight of sample. Warm solution gently, if necessary, to aid in solute dissolution. Filter the solution through compressed Pyrex wool, if necessary, to remove any solid particles.
2. Transfer the solution to a clean NMR tube, using a disposable pipet.
3. Place cap on NMR tube. Wipe all smudges and dust particles off the NMR tube with a disposable wiper.
4. Prepare a barcode label including user's initials, spectrometer, microprogram and sample solvent, and attach the label to the barcode label holder.
5. Place the barcode label holder in the NMR tube with lettering up and place the spinner below the holder.
6. Position the sample using the depth gauge.
7. Place the sample tube/spinner/barcode holder assembly into the appropriate chute on the spectometer sample changer.
8. The spectrum will be automatically obtained, processed and plotted, based on the experiment and solvent information specified on the barcode label.

| Spectrometer Parameters: | |
|---|---|
| Microprogram | PHG |
| Sweep Frequency | 121.39 MHz |
| Sweep Width | 50 KHz |
| Spectrum Size | 64 K |
| Pulse Width | 2 usec = 45° |
| Pulse Recycle | 10.0 sec |
| Inverse gated broadband H-1 decoupling | |

The average chain length of the sodium polyphosphate is calculated as follows:

Average chain length =

$$2\left(\frac{\text{Integrated Peak Area } I + \text{Integrated Peak Area } T}{\text{Integrated Peak Area } T}\right)$$

Region T from −5 to −10 ppm contains peaks assigned to terminal phosphate units in linear polyphosphates having a chain length of 2 or greater. Region I from −18 to −24 ppm contains peaks assigned to internal phosphates. Cyclic phosphates present as impurities in the samples also have peaks in Region I and are included in the calculation. The chemical shifts are referenced to external phosphoric acid.

EXAMPLE

The following example provides an illustration of a beverage product of the present invention. Sodium polyphosphate (sodium hexametaphosphate) is admixed under high sheer mixing to insure solubility. The example is illustrative of the invention and not intended to be limiting of it.

A vitamin C fortified, noncarbonated juice containing beverage having a pH of about 3.0 and 12.4 Brix is formed by combining the following ingredients:

| | |
|---|---|
| Added Water | about 84% (hardness less than 30 ppm, alkalinity less than 300 ppm) |
| High Fructose Corn Syrup HFCS-55 | about 14.1% |
| Fruit Juice Concentrate | about 0.93% (to provide in a single strength beverage about 5.2% juice) |
| Citric Acid | about 0.434% |
| Potassium Sorbate | about 300 ppm |
| Sodium Hexametaphosphate (average chain length of about n = 21) | about 1500 ppm |
| Calcium Disodium EDTA | about 25 ppm |
| Ascorbic Acid | about 463 ppm |
| Sodium Citrate | about 0.107% |
| Flavor Oils | about 0.053% |
| Thickeners | |
| CMC | about 0.02% |
| Xanthan | about 0.02% |
| Cloud (including sunflower oil) | about 0.173% |

What is claimed is:

1. A beverage composition comprising:
   at least about 1 ppm of an aminopolycarboxylic acid;
   a polyphosphate having the formula:

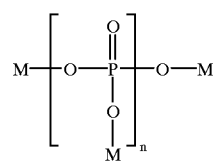

wherein n averages from about 17 to about 30 and each M is an atom independently selected from the group consisting of sodium and potassium ions; and
   a vitamin selected from the group consisting of water soluble vitamins, oil soluble vitamins, and combination thereof.

2. The beverage composition of claim 1 comprising at least about 5 ppm EDTA.

3. The beverage composition of claim 2 comprising at least about 10 ppm EDTA.

4. The beverage composition of claim 3 comprising at least about 15 ppm EDTA.

5. The beverage composition of claim 4 comprising at least about 20 ppm EDTA.

6. The beverage composition of claim 5 comprising no more than about 30 ppm EDTA.

7. The beverage composition of claim 6 wherein each M is sodium.

8. The beverage composition of claim 7 further comprising a preservative selected from the group consisting of sorbic acid, benzoic acid, alkali metal salts thereof and mixtures thereof.

9. The beverage composition of claim 1 comprising Calcium Disodium EDTA.

10. The beverage composition of claim 1 further comprising a flavor oil.

11. The beverage composition of claim 10 comprising one or more water soluble vitamins wherein at least one of the water soluble vitamins is ascorbic acid.

12. The beverage composition of claim 11 which comprises from about 1% and about 20% fruit juice, by weight of the composition.

13. The beverage composition of claim 12 wherein the beverage composition comprises less than 10% by weight fruit juice.

14. The beverage composition of claim 13 wherein the added water has an alkalinity less than about 300 ppm.

15. The beverage composition of claim 13 having a pH from about 2.5 to about 3.5.

16. The beverage composition of claim 13 comprising at least about 5 ppm EDTA.

17. The beverage composition of claim 16 further comprising a preservative selected from the group consisting of sorbic acid, benzoic acid, alkali metal salts thereof and mixtures thereof.

* * * * *